United States Patent

[11] 3,595,552

[72] Inventor Lawrence G. Nicholls
 Tyseley, England
[21] Appl No. 825,180
[22] Filed May 16, 1969
[45] Patented July 27, 1971
[73] Assignee Girling Limited
[32] Priority May 21, 1968
[33] Great Britain
[31] 24,216/68

[54] PNEUMATIC SPRINGS
 5 Claims, 2 Drawing Figs.

[52] U.S. Cl. .................................................... 267/65
[51] Int. Cl. .................................................... B60c 9/36
[50] Field of Search .................................... 267/64, 65,
 65 A, 65 B

[56] References Cited
 UNITED STATES PATENTS
 3,366,379 1/1968 McNally .................. 267/65
 3,439,913 4/1969 Kamman .................. 267/65

Primary Examiner—James B. Marbert
Attorney—Scrivener, Parker, Scrivener & Clarke ABSTRACT: A pneumatic spring comprises a cylinder having a pressure seal at its outer end, a piston and a piston rod extending slidably and sealingly through the pressure seal, characterized in that the piston rod (6) has a portion (11) of reduced cross section which can, during manufacture of the spring, be aligned with the pressure seal (4) to define with the seal (4) a passage for the flow of gas into the cylinder (1).

This invention further comprises a method of charging a pneumatic spring including a cylinder, a piston and a piston rod extending slidably through a gastight pressure seal at the outer end of the cylinder, the piston rod having near its outer end a portion of reduced cross section, characterized by the steps of holding the piston rod and cylinder in relative positions in which the said reduced portion of the piston rod is aligned with the pressure seal to create a passage between the rod and the seal without deflection of the seal, charging gas under pressure through the said passage into the cylinder, then moving the piston rod outwardly to allow the seal to engage and seal against the piston rod and then applying an end fitting to the piston rod to prevent inward movement of the rod sufficient for the reduced portion to be aligned again with the seal.

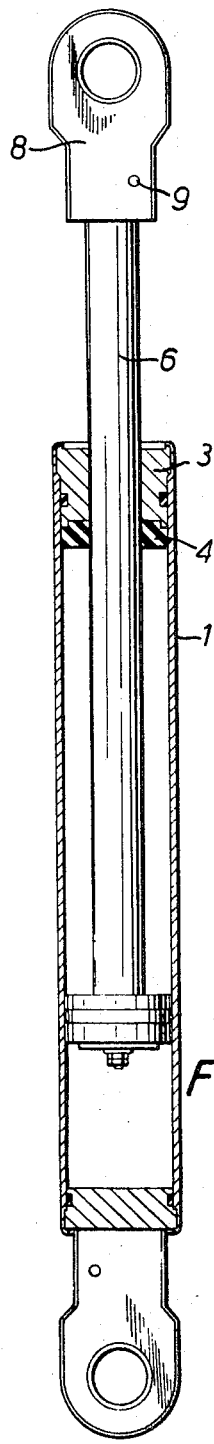
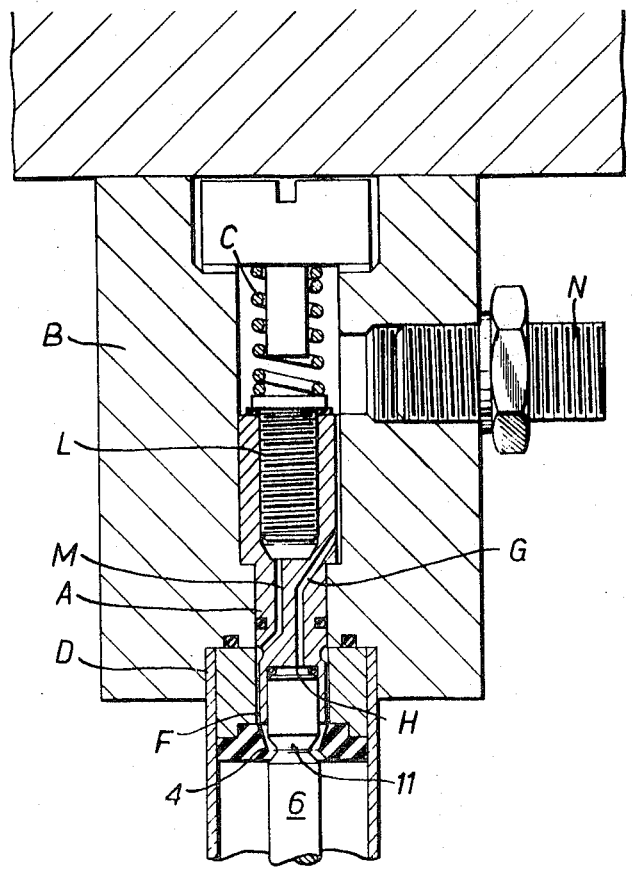
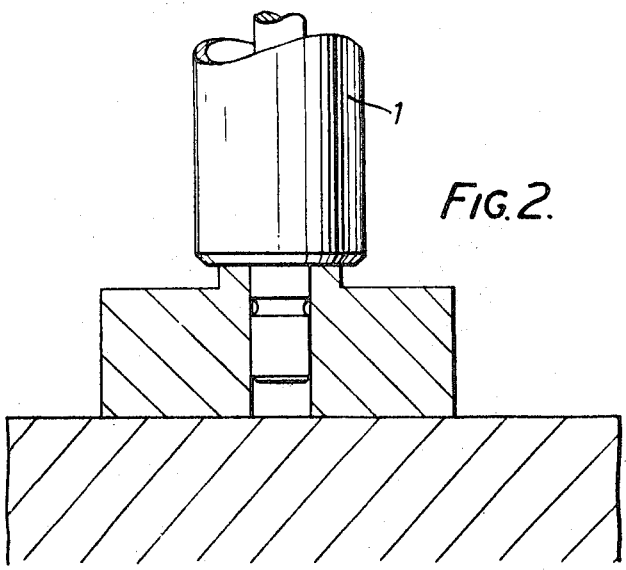
FIG. 1.
FIG. 2.

PNEUMATIC SPRINGS

This invention relates to pneumatic springs, piston and cylinder type, and to methods of charging such springs with pressurized gas.

The constructions and methods at present in general use fall into three main categories.

In the first, and end fitting in the form of a fluted plug is fitted in the full diameter end of the cylinder tube, and a sealing ring is trapped between the plug and an internal end of the cylinder wall. To charge the cylinder, gas is introduced under pressure through an annular space left between the said flange and an outwardly projecting portion of the plug. It flows around the seal and the periphery of the plug. When the cylinder is fully charged, the seal is clamped between the outer face of the plug and this flange, the clamping being assisted by the internal pressure acting on the plug. The outwardly projecting part of the plug then acts as a suspension mounting eye. A disadvantage of this arrangement is that if, in use, the plug should be displaced inwardly due, for example, to violent shock loading of the unit, the gas pressure will be lost.

In the second category, charging is effected through a passage formed in an end fitting, and when the desired pressure has been reached this passage is closed by a steel ball which is forced into the end of the passage and retained in position by deforming the end fitting material to close, partially, the mouth of the passage. One drawback of this arrangement is that the material of the end fitting requires to be relatively malleable, to permit closure of the passage, and is therefore not as rigid as would be desirable in an end fitting for a pneumatic spring for heavy duty. Also, if the retention of the plug is faulty, the sealing ball may be shot out under the internal gas pressure acting on it.

In the third category, a piston rod seal is spring loaded against the inner face of a piston rod guide, and the unit is charged by forcing gas under pressure through an annular gap left between the piston rod and the inner periphery of the rod guide. This pressurized gas forces the seal away from the rod guide, against the action of the seal spring, so that gas can flow over and around the seal into the cylinder.

At the desired charging pressure, the cylinder is closed by the seal seating against the rod guide assisted by the internal pressure and the spring. One disadvantage of such an arrangement is that manufacture is complicated by the need to supply and fit a seal spring (and a suitable abutment for it). Also it is considered undesirable for the seal to be displaced during charging, in case it fails to reseat properly after charging.

The present invention aims at the provision of a pneumatic spring and method of charging which reduce or remove the above-mentioned difficulties without complicating design and manufacture of the pneumatic spring.

Accordingly, the invention provides a pneumatic spring comprising a cylinder having a pressure seal at its outer end, a piston and a piston rod extending slidably and sealing through the pressure seal, wherein the piston rod is formed near its outer end with a portion of reduced cross section, the relative dimensions of the parts of the pneumatic spring being such that the portion of reduced cross section can be axially aligned with the pressure seal to create a passage for the flow of gas into or out of the cylinder without deflection of the seal, the said spring further comprising an end fitting which, when secured to the outer end of the piston rod, prevents inward movement of the piston rod sufficient for the reduced portion to be aligned with the pressure seal.

The invention also includes a method of charging a pneumatic spring including a cylinder, a piston and a piston rod extending slidably through a gastight pressure seal at the outer end of the cylinder, the piston rod having near its outer end a portion of reduced cross section, comprising the steps of holding the piston rod and cylinder in relative positions in which the said reduced portion of the piston rod is aligned with the pressure seal to create a passage between the rod and the seal without deflection of the seal, charging gas under pressure through the said passage into the cylinder, then moving the piston rod outwardly to allow the seal to engage and seal against the piston rod and then applying an end fitting to the piston rod to prevent inward movement of the rod sufficient for the reduced portion to be aligned again with the seal.

With these arrangements the seal is unaffected by the charging operation and should therefore be reliable in operation. Also the charging of the unit is easily checked on completion of the operation. If it is incorrect, the piston rod can be pushed in again to release pressure and the charging operation repeated. Once the unit is found to be correctly charged and sealed, the end fitting can be secured to the piston rod.

This embodiment will now be described, by way of example, with reference to the accompanying drawings, in which:

FIG. 1 is an axial cross section of a spring in accordance with the invention; and FIG. 2 is an axial cross section showing in axial section apparatus for carrying out the method of the invention.

The spring is of generally conventional form, comprising a cylinder 1 closed at one end by an end cap 2 and at its other end by a rod guide 3 carrying a piston rod or pressure seal 4, through which slides the piston rod 6 of a piston 7. The outer end of the piston rod carries an end fitting 8 secured to the rod by a dowel or roll pin 9 engaging in an annular groove 11 (FIG. 2). The provision of such a groove 11 is not conventional, the usual practice being to weld on the end fitting or to pass a dowel or roll pin through the rod, in each case at a full-diameter portion thereof. The groove 11 constitutes a portion of reduced diameter, the importance of which is explained below.

The apparatus shown in FIG. 1 comprises an adapter including a housing in the form of a block B having a cavity in which a sealed plunger A can reciprocate, the plunger being urged outwardly (downwardly as seen in FIG. 2) by a coil spring C. The outer end of the plunger A is recessed at H to receive the end of piston rod 6 and is provided in this region with external flats F. The recess H communicates with the interior cavity of block B through a passage or outlet conduit G, and the recess formed by flats F communicates by a passage or inlet conduit M with the outlet of a one-way valve L mounted in the plunger. The block has a recess D to receive the outer end of the cylinder 1 of the spring. A connection nipple N provides a means of supplying high-pressure gas from an external source (not shown) provided with a suitable control value, preferably having an inlet or supply position and an exhaust position.

In carrying out the charging, the spring is first assembled and sealed, except for the end fittings and the sealing of the piston rod 6, which is pushed fully home to bottom the piston on the end cap 2. In this position, the groove 11 is aligned with the piston rod seal 4 thus providing a path for the admission of pressurized gas to the interior of the cylinder 1, without displacing the seal. The spring is then placed in the recess D of block B, with the piston rod entering the recessed outer end of the plunger A, the rod and cylinder making sealing engagement with the block and plunger by virtue of annular static seals in the recesses. The lower end of the cylinder is suitably located in a support block and the whole assembly is then trapped between the upper and lower platens of a press.

The external control valve is operated to supply gas under pressure, which enters the spring through passage M, past the flats F and through the gap between the seal 4 and recess 11. Pressure also acts on the end of rod 6 through passage G. On operating the external control valve to its exhaust position, the interior of block B, (including passage G and recess H) is returned to atmospheric pressure, but the pressurized gas within the cylinder 1 is trapped by the one-way valve L. The piston is now unbalanced, and tends to rise, which it is allowed to do, so that the piston rod engages and seals against the seal 4. At this stage, the press can be opened and the charged spring removed. If, for any reason, the spring is not correctly pressurized, its pressure can be released by forcing the piston rod inwardly to allow the escape of gas past the seal 4 and recess 11, and the charging operation carried out again. Once correct pressurization has been effected, the end fitting 8 is applied, and this prevents the piston rod being moved inwardly sufficiently to allow the recess to align with the seal and thus accidentally release the pressure.

In some cases, a quantity of hydraulic fluid may be provided in the cylinder for progressively damping the motion of the piston at the end of its stroke, thereby avoiding shock loading of the unit and its mounting structure. In use, the unit may rotate between its illustrated position and an inverted position during extension and contraction. In such a case, the hydraulic fluid passes to the lower end of the cylinder to damp the terminal portions of one or both strokes depending upon the quantity of fluid provided.

I claim:

1. A pneumatic spring comprising a cylinder having a pressure seal at its outer end, a piston and a piston rod extending slidingly and sealingly through the pressure seal, said piston rod having near its outer end a portion of reduced cross section less than the inner diameter of said seal, the relative dimensions of said seal and said portion of reduced diameter being such that when said portion is aligned with said seal the space between said seal and said portion of reduced cross section defines a passage for the flow of gas into or out of said cylinder without deflection of said seal, and a removable end fitting secured to the outer end of said piston rod to prevent inward movement of said rod sufficient for said reduced portion to be aligned with said pressure seal except when said fitting is removed from the outer end of said piston rod.

2. A pneumatic spring according to claim 1, wherein said portion of reduced cross section is defined by an annular groove in said piston rod.

3. A pneumatic spring according to claim 2, wherein said end fitting is removably attached to said piston rod by means of a dowel pin passing through said fitting and extending chordally through said annular groove.

4. A pneumatic spring according to claim 1, wherein said portion of reduced cross section is so positioned on said piston rod that it is aligned with said seal when said piston bottoms on the inner end of said cylinder.

5. A method of charging a pneumatic spring including a cylinder, a piston and a piston rod extending slidably through a gastight pressure seal at the outer end of said cylinder, said piston rod having near its outer end a portion of reduced cross section, comprising the steps of holding said piston rod and cylinder in relative positions in which said reduced portion of the piston rod is aligned with said pressure seal to create a passage between said rod and said seal, without deflection of said seal, charging gas under pressure through said passage into said cylinder, then moving said piston rod outwardly to allow said seal to engage and seal against said piston rod and then applying an end fitting to said piston rod to prevent inward movement of the rod sufficient for said reduced portion to be aligned again with said seal.